US006486787B2

(12) United States Patent
Rieger et al.

(10) Patent No.: US 6,486,787 B2
(45) Date of Patent: Nov. 26, 2002

(54) HEAVY GOODS VEHICLE WITH AN OVERLOAD SECURITY DEVICE

(75) Inventors: Thomas Rieger, Illerrieden (DE); Peter Rosenberg, Neu-Ulm (DE)

(73) Assignee: Kirow Leipzig Kranbau Eberswalde AG, Leipzig (DE)

( * ) Notice: Subject to any disclaimer, the term of this patent is extended or adjusted under 35 U.S.C. 154(b) by 0 days.

(21) Appl. No.: 09/446,051

(22) PCT Filed: Jun. 15, 1998

(86) PCT No.: PCT/EP98/03577

§ 371 (c)(1),
(2), (4) Date: Dec. 15, 1999

(87) PCT Pub. No.: WO98/57821

PCT Pub. Date: Dec. 23, 1998

(65) Prior Publication Data

US 2002/0024431 A1 Feb. 28, 2002

(30) Foreign Application Priority Data

Jun. 15, 1997 (DE) .......................... 197 26 614
Oct. 20, 1997 (DE) .......................... 197 47 869

(51) Int. Cl.[7] .............................................. G08B 21/00
(52) U.S. Cl. ...................... 340/685; 340/611; 340/626
(58) Field of Search ................................ 340/685, 611, 340/626, 629, 689; 37/348, 902; 73/121, 168; 116/168; 414/680

(56) References Cited

U.S. PATENT DOCUMENTS

| 3,446,378 A | | 5/1969 | Miller | |
| 3,680,714 A | * | 8/1972 | Holmes | 212/145 |
| 4,354,608 A | * | 10/1982 | Wudtke | 212/191 |
| 4,742,194 A | | 5/1988 | Legris et al. | |
| 4,861,224 A | * | 8/1989 | Holmes | 414/680 |
| 4,906,977 A | | 3/1990 | Huey-Jeng | |
| 4,906,981 A | * | 3/1990 | Nield | 340/685 |
| 5,305,680 A | | 4/1994 | Weber | |
| 5,437,531 A | * | 8/1995 | Kress | 414/555 |
| 5,516,174 A | * | 5/1996 | Squyres | 294/86.41 |
| 5,597,080 A | * | 1/1997 | Culwell | 212/278 |
| 5,845,494 A | * | 12/1998 | Nishizawa | 60/403 |
| 5,995,001 A | * | 11/1999 | Wellman | 340/438 |
| 6,087,945 A | * | 7/2000 | Yasuda | 340/611 |

FOREIGN PATENT DOCUMENTS

| DE | 34 26 310 | 2/1986 |
| DE | 37 11 232 | 10/1987 |
| DE | 36 05 665 | 10/1991 |
| EP | 300 813 | 1/1989 |
| EP | 340 402 | 11/1989 |
| GB | 2 171 385 | 8/1986 |

* cited by examiner

*Primary Examiner*—Ahn La
(74) *Attorney, Agent, or Firm*—Cohen, Pontani, Lieberman & Pavane

(57) ABSTRACT

The invention relates to a heavy goods vehicle, specially for the transportation of slag, comprising a loading platform for vessels containing slag, fitted with a gripper device for receiving and moving a standardized load-bearing implement which can be actuated by a hydraulic cylinder (11) and an anti-tilt device (15) for the vehicle which operates during movement of the load-bearing implement. The vehicle is also fitted with at least one hydraulic cylinder (11) with switches. Upon a given stroke of the piston, at least one switch engages a device detecting hydraulic pressure inside the cylinder on one or both sides of the piston. The pressure detection device triggers a security device, e.g. a display for the driver or an operation blocking device.

10 Claims, 3 Drawing Sheets

HEAVY GOODS VEHICLE WITH AN OVERLOAD SECURITY DEVICE

PRIORITY CLAIM

This is a U.S. national stage of application No. PCT/EP98/03577, filed on Jun. 15, 1998. Priority is claimed on that application and on the following application(s):

Country: German, Application No.: 197 26 614.2, Filed: Jun. 15, 1997;

Country: German, Application No.: 197 47 869.7, Filed: Oct. 20, 1997.

BACKGROUND OF THE INVENTION

1 Field of the Invention

The invention is directed to a heavy-duty vehicle with a gripping device for picking up and moving a standardized load carrier which can be actuated by hydraulic cylinders and tipping-prevention means for the vehicle which are in operation during the movement of the load carrier.

2 Discussion of the Prior Art

A vehicle of the generic type is known from German Reference DE 36 05 665 C2. It is used for lifting, transporting and tipping a slag vessel, or the like, provided with side trunnions and is outfitted with a self-driven traction machine and a load transport part provided with wheels. A swiveling frame, serving to grip the trunnions and pick up the vessel, is mounted in a swivelable manner on the rear end of the loading part. The swiveling frame is moved by a hydraulic cylinder which occupies different positions for picking up, emptying and depositing the vessel.

A jib base which can telescope out hydraulically and which can be supported on the ground when the vessel is lifted or emptied by the swiveling frame is arranged at the end of the vehicle so that the vehicle is not subject to impermissible tilting moments or loading moments for the undercarriage as a result of the slag vessel to be swiveled over the rear. Further safety devices are not disclosed.

Road vehicles by which rubbish receptacles, for example, can be picked up and placed on a platform of the vehicle, likewise with a rear swiveling device, are known from practice. However, vehicles of this type generally have different emptying devices than those shown in DE 36 05 665 C2. In order that the vehicles can pick up the receptacles by the trunnions or similar stops, these load carriers must be standardized so that gripping devices can always find their target at the same position.

Although the empty (tare) weight is usually written on the receptacle, only the driver can estimate for himself whether or not the container is too heavy for the transport vehicle. This results in overloading of the vehicle beyond the permissible working load and also in a problem for the stability of the vehicle when lifting the receptacle.

SUMMARY OF THE INVENTION

Therefore, the problem addressed by the present invention is to increase the safety of load transporters of the type mentioned above and to give the driver information about the working load or safety hazards which might possibly occur. Overloading of or hazardous work with the load vehicle must also be eliminated.

The invention is based on the idea that work with heavy-duty transporters can lead to serious accidents as a result of carelessness on the part of the operator and that, therefore, the driver should be given information in every case about the working load to be handled for all working positions and loading work and, in every instance, incorrect operation based on erroneous appraisal of the situation should be prevented by appropriate automated functions of the vehicle.

For this purpose, according to the invention, at least one of the hydraulic cylinders of the gripping device, preferably the hydraulic cylinder used as a swiveling cylinder for the gripping device, is provided with switches, at least one of which engages a pressure detection device for the hydraulic pressure in the cylinder on one or both sides of the piston at a predefinable stroke of the piston. The pressure detection device switches on a safety device when a reference value for the pressure, which can be preset, is exceeded.

The safety device can be an optical or acoustic signal transmitter for the driver or can also comprise a plain text display or indicator which, in addition, also lights up in color.

In addition, the safety device should comprise a supporting base for the vehicle frame, which safety device, when engaged, activates the supporting base depending on a signal from the pressure detection device. This need not be carried out automatically, but rather can also be triggered manually by the driver. Naturally, a mechanical supporting base can also be swiveled in by the driver based on the indicator. In this case, however, the driver would have to cancel the acoustic or optical indicator before setting the vehicle in operation after ensuring that the supporting base is also in position.

The switches at the hydraulic cylinder are constructed as noncontacting or contacting limit switches or the like and are coupled with a device which likewise carries out a movement or which can be appropriately switched at a stroke of the piston of the cylinder. The limit switch engages after a predefinable piston stroke and the pressure monitoring means in the cylinder are accordingly switched on. The device can act as a rod which is movable parallel to the stroke or as another kind of actuation device, e.g., one which also acts corresponding to the stroke, e.g., an inductive displacement pickup with or without mechanical, fluid or electric signal generation and transmission.

The pressure detection devices in the cylinder can also be constructed as simple pressure switches and, in this case, are preferably arranged in the pressure line to the piston face side or piston ring face side. An arrangement of this kind makes it possible to monitor the pressure switches.

Instead of a simple pressure switch, the pressure detection device can also be provided with means for generating a signal corresponding to, preferably proportional to, the pressure, wherein this signal can be used multiple times. On the one hand, a plain text display can be supplied to the driver in order to provide the driver with information about the working load that the driver currently desires to move, or a scale or weighing device which, if required, may be electronically controlled and also configured in recording mode so that the driver can document the transported loads at the same time. When standardized load carriers, for example, buckets or mandrels which can pick up paper rolls or steel rolls, are used for this purpose, the weight of these load carriers can be accounted for at the same time and subtracted as tare weight from the load to be picked up in order to arrive at the working load.

Naturally, it is important, especially for road transport, that the driver knows what working load he is transporting so as not to exceed the permissible vehicle weights, for example, on bridges.

In the event that the pressure detection device is only constructed as a pressure switch, a pressure switch of this type can be used to block the movement elements or the hydraulic system of the vehicle, or the vehicle can be halted in general. In such cases, the blocking means would have to be connected with a key-operated switch in order to allow the driver to set the vehicle in motion again after an appropriate correction of the load to be picked up or to operate the device within certain limits up to a predetermined reference value, which might often be necessary for emergencies.

Insofar as the heavy-duty vehicle is to be used, for example, as a device similar to a slag transporter, gripping devices acting in parallel on both sides of the heavy-duty vehicle with a corresponding rear swiveling device for buckets or the like load carriers are usually used. In order to prevent one-sided loading, the hydraulic cylinders could be provided with corresponding pressure detection devices and/or limit switches on both sides. This may only be necessary if no precautions have been taken by means of appropriate simultaneous-running or synchronizing elements such as connectors for the gripper devices mounted at both sides or corresponding torsion elements which distribute the load over the vehicle.

The vehicle according to the invention can be used in particular as a slag transport vehicle for picking up slag buckets on a loading platform, since handling of hot slag is hazardous and the suggested tipping-prevention devices substantially prevent incorrect operation.

The invention will be described more fully with reference to schematic drawings.

DETAILED DESCRIPTION OF THE PREFERRED EMBODIMENTS

Hereinafter, identical parts or parts having identical function are provided with identical reference numbers.

First, the functioning of the overall device and of several individual parts in combination will be described, followed by a few important details.

Figure 1:
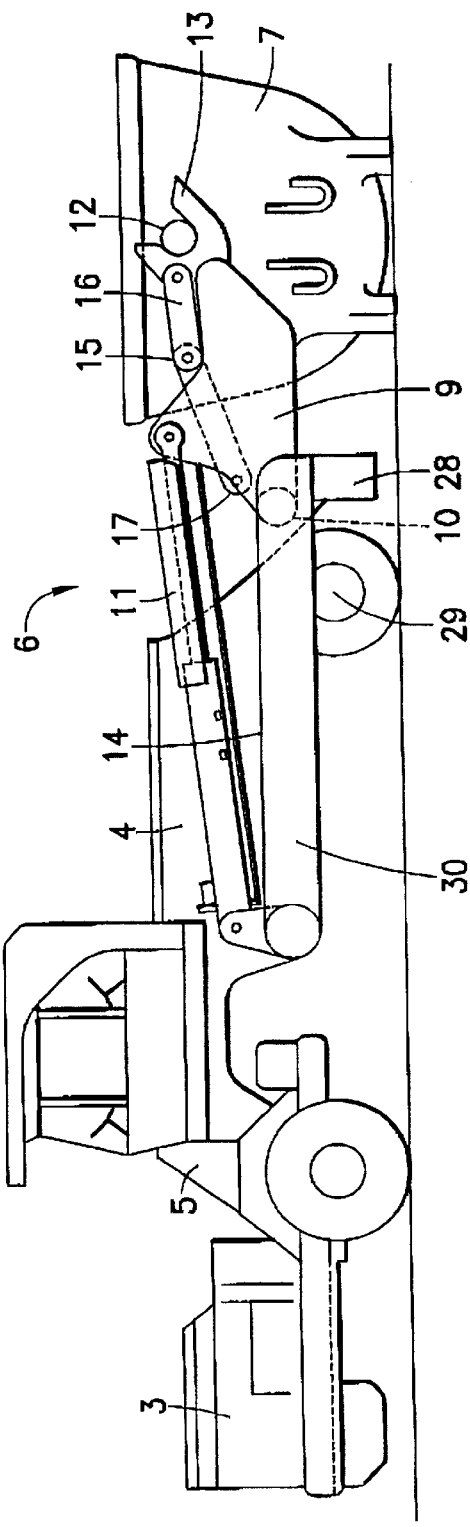
FIG. 1 shows the vehicle according to the invention in the ready position for picking up a standardized load carrier, in this case a slag bucket.
Figure 4:
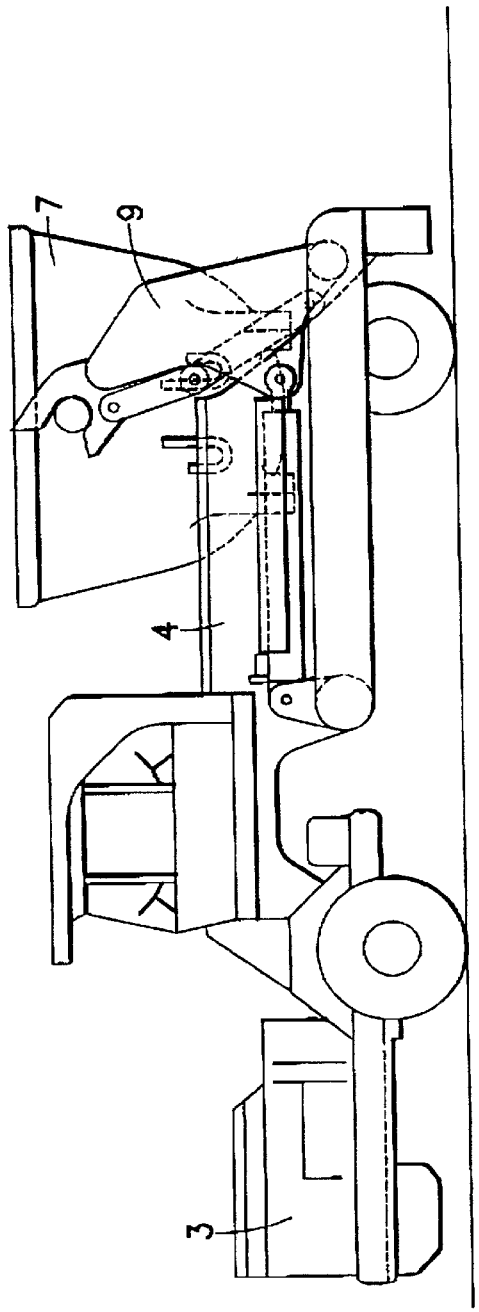
FIG. 4 shows a loaded heavy-duty vehicle.

The vehicle according to FIGS. 1 and 4 essentially comprises the driving head 3 and the load part 4. It is intended especially for transporting liquid material such as liquid slag or molten steel in metallurgical plants and steel mills and is oriented toward the adverse conditions of use prevailing in such plants.

The load part 4 is connected with the driving head 3 by a bending-pendulum bearing 5. The tilting device 6 for the slag bucket 7 is located on the load part 4. The slag bucket, is used herein synonymously with other similarly standardized load carriers. Other load carriers could be handled in the same way with the vehicle.

The slag bucket 7 is picked up from the ground by the hydraulic tilting device 6. Instead of being level with the ground, the slag bucket 7 could also stand on a platform or in a depression relative to the level of the road on which the load vehicle is driving. Naturally, this results in different leverages in the hydraulic tipping system and in the hydraulic cylinder itself because the centers of gravity differ from one another and the lever ratios vary.

Figure 5:
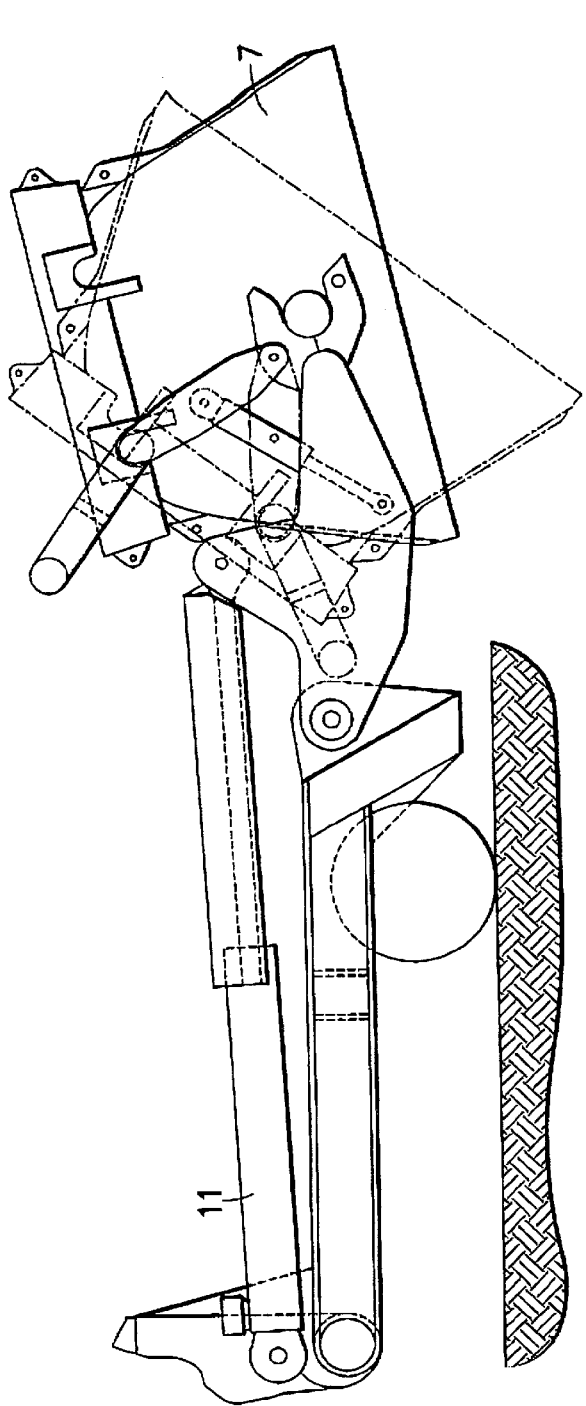
FIG. 5 shows a section of the vehicle with a slag bucket according to FIG. 4, but in emptying positions of the tilting cylinder and bucket.

In order to pick up the bucket 7, the vehicle drives backward toward the bucket 7 with lowered tilting device 6, as is shown in FIG. 1, and lifts the bucket 7 with the tilting device 6. As soon as the tilting device 6 has been moved in completely (FIG. 4), the slag bucket 7 can be locked and then emptied by moving out the tilting device 6 (FIG. 5). After the bucket 7 has been emptied, it can be turned completely around with the tilting device 6 and deposited on the ground (FIG. 6) or, after being filled again according to FIG. 1, can be placed on the ground or in the original position on the vehicle.

The tilting device 6 is a welded steel construction comprising two tilting arms 9 (FIG. 1) which are connected with one another by a stable torsion pipe 10 transverse to the vehicle. The torsion pipe 10 in this case ensures the synchronous running of the tilting arms 9 on both sides.

The tilting arms 9 are mounted at the rear of the vehicle and are moved in and out by the main tilting cylinder 11. The tilting device 6 is actuated by a master switch in the driver's cabin.

Figure 6:
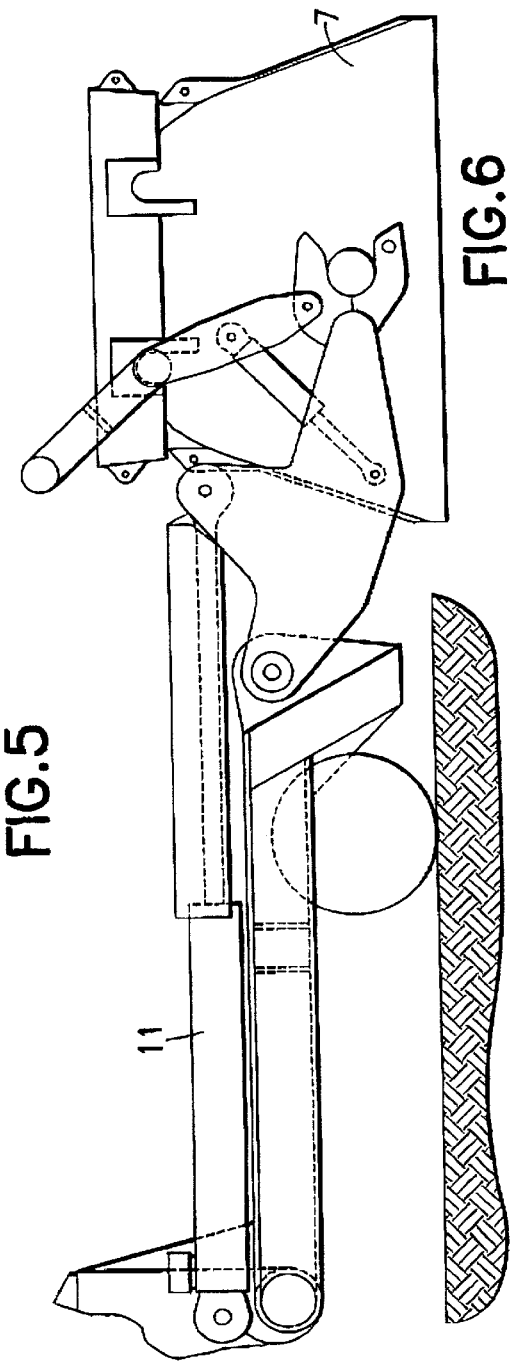
FIG. 6 shows a depositing position for depositing a slag bucket according to FIG. 4 with corresponding positioning of the hydraulic cylinder.

In order to pick up the slag bucket 7, the vehicle drives backward toward the slag bucket 7 with the tilting arms 9 extended as illustrated in FIG. 1 and picks up the bucket trunnion 12 with the claw 13 of the tilting arm 9. The slag bucket 7 is lifted onto the platform 14 by the inward movement of the tilting cylinders 11. As soon as the slag bucket is in the driving position (FIG. 4), it can be locked by means of the side locking cylinder 15. Only after this has been carried out is the vehicle ready to empty the slag bucket 7 by means of the outward movement of the tilting cylinders 11(FIG. 5). This is carried out in particular by an additional tilting device 16 which enables a tilting angle of up to 180° (FIG. 6). The slag bucket 7 can be completely emptied in this way, of course. This additional tilting device 16 itself comprises two hydraulic cylinders which are accommodated in the tilting arms. In this case, again, a transverse pipe 17 ensures the synchronous running of the cylinders on both sides of the vessel.

Since the loading of the tilting system can fluctuate sharply depending on the pickup height, namely, the ground or a depression or a platform, the slag transporter is outfitted with overload-protection means. This prevents the picking up of an impermissibly large weight or an impermissibly large torque. The overload protection can be adapted to the different pickup positions and, naturally, also to the different types of load carriers or other operating conditions.

Figure 3:
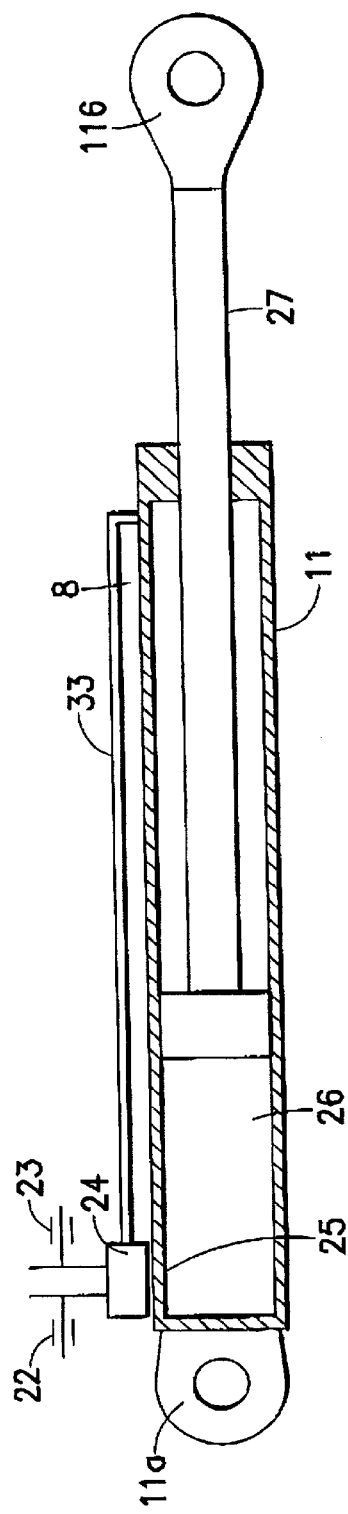
FIG. 3 shows the cylinder according to FIG. 2 in section with additional elements.

The overload-protection means essentially comprise two limit switches 1a, 1b which are in an operative connection with two pressure detection devices 22, 23 according to FIG. 3. The limit switches 1a, 1b are positioned at the tilting cylinder 11 in such a way that they are engaged at a given stroke of the cylinder.

If the driver wants to move the full slag bucket into the vehicle, it is necessary for safety reasons to know whether or not the maximum working load prescribed by the vehicle manufacturer is exceeded. In the initial position according to FIG. 1, the moved out cylinder 11 has released a limit switch 1b and accordingly triggered a signal for measuring the pressure in the tilting cylinder ring face space 8 (FIG. 3). The triggering of the signal for measuring is accordingly associated with a determined position of the tilting cylinder 11 and a determined position of the tilting arm 9 and with a determined position of the slag bucket 7. In these positions, which are to be determined in advance and which are known on-site in the plant, the pressure in the tilting cylinder ring face space 8 and the moments exerted by the construction masses and working load are in a defined relationship relative to one another, i.e., the actual working load can be determined, if required, added to the receptacle weight or added to the weight of the other load carrier. These values which are determined in this way can be processed as input values in electronics accommodated in the vehicle and can consequently provide the driver with information about the working load, as such, or about a possible exceeding of the permissible working load. Optical, acoustic or plain text signals are used for this purpose. Further, the work hydraulics or the hydraulic system or electronic components thereof can be acted upon by a signal, so that they are put out of operation. In certain cases, however, it is useful when the driver can override this safety lock by means of a key-operated switch by his own initiative within certain limits.

At the same time, a weighing device or scale can be actuated in a manner not shown by means of these pressure detection means in order to document the working load that is actually transported.

Alternatively or in addition to this information about the working load, the system is also used for monitoring the pickup process for picking up the full slag bucket. In this case, it must be ensured by additional means that the vehicle has the required stability.

In case of operating errors or failure to observe rules pertaining to dimensions, it may happen that the vehicle tilts about the rear axle 29 when picking up a full slag bucket and the vehicle frame 30 (FIG. 1) is loaded to an impermissible degree, which again constitutes a considerable safety risk for the driver.

In order to prevent incorrect operation, the warning signal described above is configured in such a way that the driver is alerted about his incorrect operation or further operation of the vehicle is blocked. The driver then has the possibility of manually mounting a supporting device 28 at the rear side of the vehicle or setting an existing supporting device in operation. Naturally, when the signals are coupled by the pressure detection devices in a corresponding manner, the supporting device can also be put into operation automatically, so that the loading process proceeds faster and an incorrect arrangement of the supporting device 28, for example, a hydraulic supporting base under the vehicle frame 30 behind the wheel axle 29, is ruled out. The pressure level for the pressure detection devices 22, 23, for example, simple pressure switches, is advisably selected so as to be high enough to enable certain work below this level without a supporting base being moved out, for example, the handling of an empty slag bucket 7 (FIG. 6), but without jeopardizing the required stability when moving the empty bucket.

The measurement points or arrangement points for the limit switches 1a, 1b at the hydraulic cylinder 11 and also the arrangement of the pressure detection device 22, 23 on the piston rod side should be identical for these purposes in the arrangement shown in the drawings. This system accordingly has the function of informing about the permissible or maximum working load and also has the function of preventing an overloading of the vehicle when picking up full slag buckets or the like standardized load carriers.

It is necessary when emptying the full slag bucket 7, or before depositing the full slag bucket, to set the supporting device 28 in operation because stability could also be impaired in these movement processes and the vehicle could tilt or be impermissibly loaded also when picking up the slag bucket.

In order to prevent incorrect operation of this kind, a pressure detection device 22 is also mounted on the tilting cylinder piston side, so that there is also information abut the pressure ratios in the system when movements of the type mentioned above are carried out. For this purpose, the corresponding vehicle geometry and stroke position of the cylinder 11 (FIG. 1) are again taken into account and, in this case, the pressure detection device is put into operation via the limit switch 1a (FIG. 2).

The optical or acoustic warning system mentioned above can be used in a similar manner with alternative signals to alert the driver of possible incorrect operation in these cases.

The functions of the vehicle in principle can be readily discerned from the position for road travel in FIG. 4, the position for picking up the slag bucket in FIG. 1, the emptying positions of the slag bucket in FIG. 5, and the possible upside-down depositing position of the empty slag receptacle shown in FIG. 6. Details of FIGS. 2 and 3 will be described briefly hereinafter. The hydraulic cylinder or tilting cylinder 11 is secured to the vehicle, in this case, the load part 4 (FIG. 1), by the eye 11a, while the cylinder eye 11b is coupled to the tilting device 6 and the tilting arms 9. A pipe 21 is arranged in parallel orientation at the cylinder 11 by fastenings 20, wherein a rod 18 which is coupled with the eye 11b via a fastening 19 is mounted in a displaceable manner in the interior of the pipe 21. Two limit switches 1a and 1b are positioned at the cylinder for different movement functions, taking into account the respective moment or torque during operation, such that the limit switches 1a and 1b an detect the end of the rod 18 which is displaceable with the piston rod 27. The limit switches generate a signal from detection of the rod end and accordingly act upon the pressure detection devices 22, 23 (FIG. 3).

Figure 2:
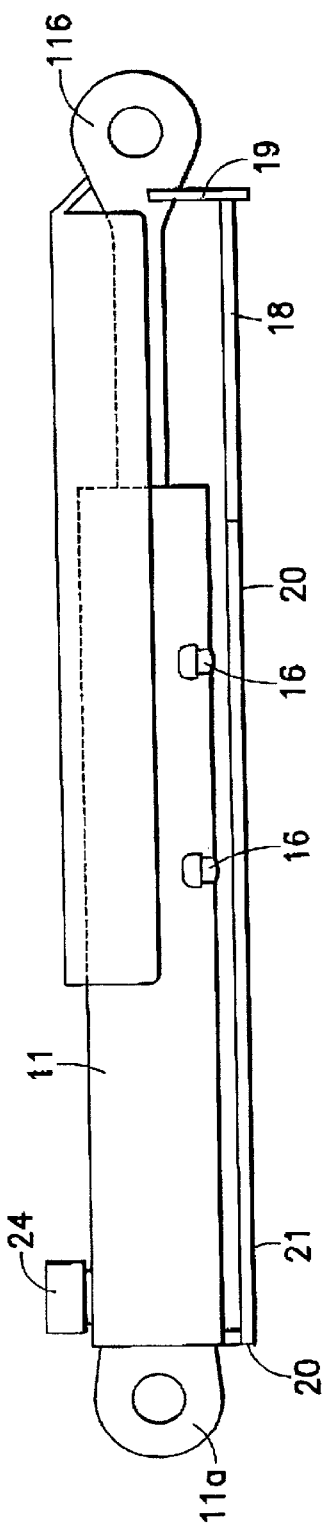
FIG. 2 shows an enlarged schematic view of a hydraulic cylinder which is used as a tilting cylinder.

FIG. 3 shows a view of the cylinder according to FIG. 2 in section with the pressure space 26 and the annular space 8 on the piston rod side. The pressure switches 22, 23 are coupled to the pressure spaces close to the directional valve 24 via pressure lines 25 and 33, respectively. These pressure switches 22, 23 can be used not only as simple switches, but also, for example, as proportional signal transmitters for a display or indicator proportional to the working load. This display can also be part of a weighing device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

What is claimed is:

1. A heavy-duty vehicle, comprising:
    a frame;
    a gripping device mounted on the frame for picking up and moving a standardized load carrier;
    hydraulic cylinders operatively connected between the frame and the gripping device for actuating the gripping device, the cylinders each having a piston and a piston rod;
    tipping prevention means for preventing tipping of the vehicle during movement of the load carrier;

a switch provided on at least one of the hydraulic cylinders;

a pressure detection device operationally connected to the switch so that the pressure detection device is engaged at a predefinable stroke of the piston to determine hydraulic pressure in the cylinder on at least one side of the piston; and a safety device operatively connected to the pressure detection device so that the pressure detection device switches on the safety device when a reference value for the pressure is exceeded.

2. A heavy-duty vehicle according to claim 1 wherein the safety device is one of an optical signal transmitter and an acoustic signal transmitter.

3. A heavy-duty vehicle according to claim 1, wherein the safety device comprises a supporting base for the vehicle frame mounted on a rear end of the frame so that the supporting base can be moved into an operating position.

4. A heavy-duty vehicle according to claim 1, wherein the safety device comprises means for blocking a hydraulic system of the hydraulic cylinders.

5. A heavy-duty vehicle according to claim 1, wherein the switch is a limit switch, and further comprising an actuating device operative corresponding to piston rod stroke and operatively connected to the limit switch.

6. A heavy-duty vehicle according to claim 1, wherein the pressure detection device is a pressure switch and is arranged in a pressure line leading to a respective side of the piston.

7. A heavy-duty vehicle according to claim 4, wherein the blocking means is actuatable by key-operated switches.

8. A heavy-duty vehicle according to claim 1, wherein the pressure detection device includes a weighing device, means for generating a signal proportional to pressure for the weighing device, and a display operative to display the signal.

9. A heavy-duty device according to claim 1, wherein the gripping device comprises a rear swiveling device for one of buckets and load carriers that can be grasped at stops provided at two sides of the bucket or load carrier.

10. A heavy-duty vehicle for transporting slag, comprising:

a loading platform for slag vessels;

a frame;

a gripping device mounted on the frame for picking up and moving a standardized load carrier;

hydraulic cylinders operatively connected between the frame and the gripping device for actuating the gripping device, the cylinders each having a piston and a piston rod;

tipping prevention means for preventing tipping of the vehicle during movement of the load carrier;

a switch provided on at least one of the hydraulic cylinders;

a pressure detection device operationally connected to the switch so that the pressure detection device is engaged at a predefinable stroke of the piston, hydraulic pressure in the cylinder on at least one side of the piston; and a safety device operatively connected to the pressure detection device so that the pressure detection device switches on the safety device when a reference value for the pressure is exceeded.

* * * * *